(12) United States Patent
Hirano et al.

(10) Patent No.: US 6,563,660 B1
(45) Date of Patent: May 13, 2003

(54) ACTUATOR CONTROL METHOD AND STORAGE DEVICE

(75) Inventors: Masakazu Hirano, Kawasaki (JP); Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 354 days.

(21) Appl. No.: 09/675,471

(22) Filed: Sep. 28, 2000

(30) Foreign Application Priority Data

Nov. 29, 1999 (JP) .......................................... 11-337959

(51) Int. Cl.$^7$ .............................................. G11B 21/02
(52) U.S. Cl. ........................................ 360/75; 360/78.06
(58) Field of Search ............................... 360/75, 78.06, 360/78.04, 73.03, 133, 254.8, 255.7

(56) References Cited

U.S. PATENT DOCUMENTS

| | | | | |
|---|---|---|---|---|
| 5,638,241 A | * | 6/1997 | Sonderegger | ............... 360/133 |
| 5,666,236 A | * | 9/1997 | Bracken et al. | ............... 360/75 |
| 5,969,899 A | * | 10/1999 | Utenick et al. | .......... 360/78.04 |
| 6,201,665 B1 | * | 3/2001 | Angellotti et al. | ........ 360/255.7 |
| 6,229,663 B1 | * | 5/2001 | Yoneda et al. | ................ 360/75 |
| 6,292,333 B1 | * | 9/2001 | Blumentritt et al. | ..... 360/254.8 |
| 6,388,832 B1 | * | 5/2002 | Dobbek et al. | .......... 360/73.03 |
| 6,396,652 B1 | * | 5/2002 | Kawachi et al. | .............. 360/75 |

* cited by examiner

*Primary Examiner*—David Hudspeth
*Assistant Examiner*—Fred F. Tzeng
(74) *Attorney, Agent, or Firm*—Greer, Burns & Crain, Ltd.

(57) ABSTRACT

This invention relates to a motor velocity control method and storage device for performing loading/unloading control of a head that reads from a storage medium in order to move it away from the storage medium. In order to detect accurate velocity from the counter electromotive voltage of the motor for performing loading/unloading control, the storage device comprises a storage medium 6, head 4, actuator 3, control circuit 19 and ramp 11. Velocity control is performed by using the velocity detected from the counter electromotive voltage of the actuator 3 in the unloading/loading control of moving the head 4 away from the storage medium 6. Moreover, the transient response voltage of the actuator is calculated and the detected voltage is corrected. Furthermore, the velocity offset coefficient for converting the counter electromotive voltage to velocity is calibrated. Also, the velocity correction coefficient for converting the counter electromotive voltage to velocity is calibrated. This makes it possible to obtain accurate velocity from the counter electromotive voltage.

17 Claims, 15 Drawing Sheets

ACTUATOR CONTROL METHOD AND STORAGE DEVICE

BACKGROUND OF THE INVENTION

1. Field of the Invention

This invention relates to an actuator control method and storage device for detecting an actuator velocity from the counter electromotive voltage of the actuator, and particularly to an actuator control method and storage device for performing an unloading operation that moves the head which reads the storage medium away from the storage medium when not in use (when there is no access command within a specified time).

2. Description of the Related Art

Storage devices that have a head for reading storage medium are widely used. For example magnetic disk drives used as storage devices for computer comprise a magnetic disk, a head for reading from and writing to the magnetic disk, and a VCM actuator for positioning the head on a track of the magnetic disk. The storage density of these kinds of disk drives is rapidly increasing, and compact disk drives are currently being developed for them. Compact disk drives are separate and portable, and can also be used as the external storage device of a portable handheld computer.

Hard disk drives comprise a magnetic disk, a magnetic head, a VCM actuator, and a flexure (suspension). In this kind of hard disk drive, as the density of the magnetic disk has increased in recent years, the distance that the magnetic head floats above the magnetic disk has decreased. Therefore, the magnetic head can easily come in contact with the magnetic disk by even a small vibration and damage both the disk and head.

In order to prevent this, a hard disk drive has been proposed (for example in Japanese Unexamined published patent No. H6-60578) in which a ramp is installed at a position away from the magnetic disk, and when the head is not in operation, it moves to the position of the ramp so it is out of the way (this is called the unloading operation).

Recent hard disk drives and the electronic devices (computers, etc.) in which they are installed have become more and more portable. Therefore, the hard disk drive is used in an environment in which it is easy for it to receive external vibration. Moreover, since the electronic devices are driven by battery, the capacity of the power supply is limited. Therefore, it is desirable to reduce the power consumption.

To meet this demand, in conventional storage devices, a continuous time of no access (I/O command) is counted, and when it reaches a specified time, the aforementioned unloading operation is performed and the head is moved away from the magnetic disk. In this method, when no access continues for a specified time, the head moves away from the magnetic disk, so it is possible to prevent damage to the disk and head even when there is external vibration. Also, since the head is supported mechanically by the ramp, there is no need for drive current to flow to the VCM, so it is also possible to reduce the power consumption. Moreover, when there is access, the head returns from the ramp to the magnetic disk (this is called loading), and in this way the head is loaded only when in operation.

However, the prior art has the following problems.

(1) In the prior art, the moving velocity of the head is not controlled during loading/unloading. In the storage device, the servo information (position information) recorded on the disk is read by the head and the velocity and position of the head are detected. However, since the head is separated from the disk during loading/unloading, the servo information cannot be read, thereby the velocity cannot be detected. Therefore, there is the problem that during unloading, the head may hit the ramp, or that during loading, the head may hit the disk. There is also the problem that when decreasing the velocity of movement during loading/unloading in order to lighten this impact, it is impossible to perform high-speed loading/unloading.

(2) Also, detecting the velocity from the counter electromotive voltage of the motor (actuator) is well known, however a transient response occurs due to the motor inductance. Therefore, there it is necessary to wait until the transient response settled before detecting the counter electromotive voltage for detecting the velocity. Therefore, there is the problem that it is not possible to shorten the detection interval and thus making high-precision velocity control difficult.

(3) Moreover, in order to convert the counter electromotive voltage of the motor (actuator) into velocity, it is necessary to properly set the velocity offset coefficient. However, this velocity offset coefficient changes depending on each individual circuit and temperature, so there is the problem that it is difficult to properly set the velocity offset coefficient.

(4) Furthermore, in order to convert the counter electromotive voltage of the motor (actuator) into velocity, it is necessary to properly set a correction coefficient. However, this correction coefficient changes depending on the device and temperature, so there is the problem that it is difficult to properly set the correction coefficient.

SUMMARY OF THE INVENTION

The objective of this invention is to provide an actuator control method and storage device for controlling the actuator velocity even when the head cannot read from the storage medium during loading/unloading.

Another objective of this invention is to provide an actuator control method and storage device for shortening the interval of detecting the actuator counter electromotive voltage in order to perform high-precision velocity control.

A further objective of this invention is to provide an actuator control method and storage device for obtaining a proper velocity offset coefficient for converting the counter electromotive voltage of the motor (actuator) into velocity.

Yet a further objective of this invention is to provide an actuator control method and storage device for obtaining a proper correction offset coefficient for converting the counter electromotive voltage of the motor (actuator) into velocity.

In order to accomplish these objectives, the storage device of this invention comprises a head for at least reading the storage medium, an actuator for positioning the head at a specify location on the storage medium, a ramp for supporting the head and located at a position away from the storage medium, a storage means for storing specified parameters, and control means for unloading the head from the storage medium to a position on the ramp, and also for loading the head from the ramp at a position on the storage medium. In addition, the control means calculate the amount to control the actuator and calibrate the parameter when unloading or loading the head based on the output of a counter electromotive voltage detection circuit and the aforementioned parameters.

In this form of the invention, during unloading/loading when the head cannot read from the storage medium, the movement velocity of the actuator is detected from and controlled based on the counter electromotive voltage of the actuator and the parameters, so it is possible to control the velocity during unloading/loading, and thus it is possible to prevent the head from hitting the ramp and the storage medium, and high-speed movement is possible.

Moreover, since the parameters (transient response voltage, offset coefficient, correction coefficient, etc.) are corrected, accurate velocity control is possible.

In another form of the invention, the control means of the storage device, in order to detect the movement velocity of the actuator, updates the drive current of the actuator, then subtracts the transient response voltage of the actuator from the detected voltage of the actuator and calculates the counter electromotive voltage of the actuator and velocity of the actuator from the counter electromotive voltage. In addition, the control method for the actuator comprises a step of calculating the control amount for the actuator from the counter electromotive voltage of the actuator and the aforementioned parameters.

In this form of the invention, the transient response voltage of the motor is calculated from the drive current, and the counter electromotive voltage is calculated from the detected voltage of the motor and the transient response voltage by using the correction value (parameter) for the output of the counter electromotive voltage detection circuit, and by calculating the control amount with the calculated counter electromotive voltage, it makes high-precision velocity control possible.

In addition, in another form of the invention, the control means of the storage device flow drive current to the actuator with the actuator in a fixed state, and measure the velocity offset coefficient of the actuator. Moreover, the control method comprises a step of flowing drive current to the motor with the motor in a fixed state, and measuring the velocity offset coefficient of the motor, a step of detecting the counter electromotive voltage of the motor, a step of calculating the velocity of the motor from the counter electromotive voltage and velocity offset coefficient of the motor, and a step of controlling the velocity of the motor based on the detected velocity of the motor.

In this form of the invention, drive current flows to the motor while the motor is in a fixed state, and the velocity offset coefficient of the motor is calculated, so calibration of a proper velocity offset coefficient based on the device and temperature is possible.

Furthermore, in another form of the invention, the control means of the storage device measures the velocity offset coefficient during loading. No special measurement operation is necessary because automatic measurement is performed during the loading. Therefore, it is possible to reduce the waiting time of the storage device.

Moreover, in the control method of this invention, the measurement step comprises a step of flowing a first value of drive current to the motor in a fixed state and detecting a first counter electromotive voltage for the motor, a step of flowing a second value of drive current to the motor in a fixed state and detecting a second counter electromotive voltage for the motor, and a step of calculating the velocity offset coefficient of the motor from the difference of the two counter electromotive voltage.

This makes it possible to measure an accurate velocity offset coefficient.

In another form of the invention, the control means of the storage device corrects the correction coefficient for converting the counter electromotive voltage to movement velocity, based on the movement velocity of the actuator that is calculated from the position information that is read by the head from the storage medium, and the movement velocity that is detected from the counter electromotive voltage of the actuator.

In this form of the invention, the correction coefficient is corrected such that the movement velocity detected from the counter electromotive voltage matches the movement velocity of the actuator that is calculated from the position information from the storage device. Therefore, it is possible to convert the counter electromotive voltage into accurate movement velocity.

Furthermore, in another form of the invention, the control means of the storage device corrects the correction coefficient during unloading. This makes measurement possible without any special measurement operation. Therefore, it is possible to reduce the waiting time of the storage device.

DESCRIPTION OF THE PREFERRED EMBODIMENTS

Figure 1:
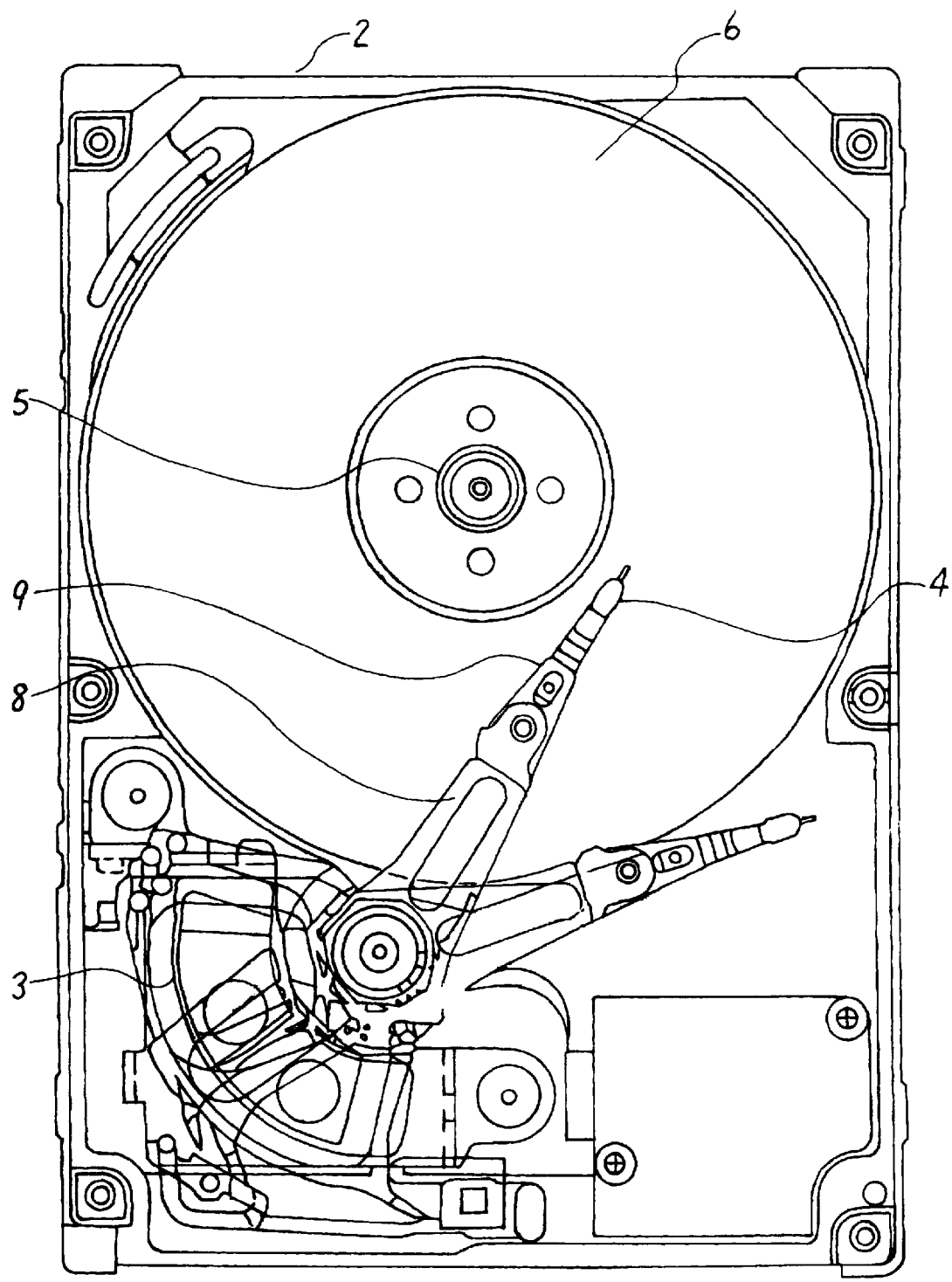
FIG. 1 is a top view of the storage device of an embodiment of the invention.
Figure 2:
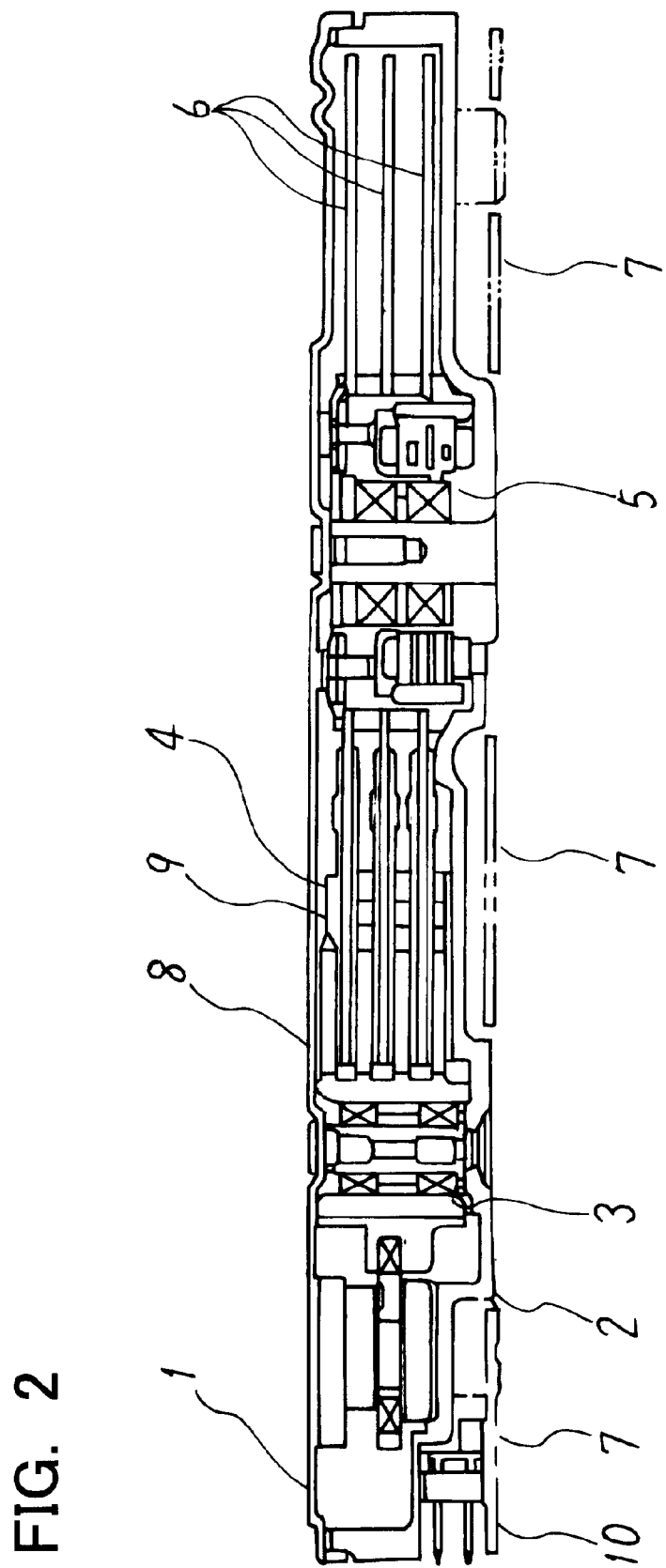
FIG. 2 is a cross-sectional view of the storage device in FIG. 1.
Figure 3:
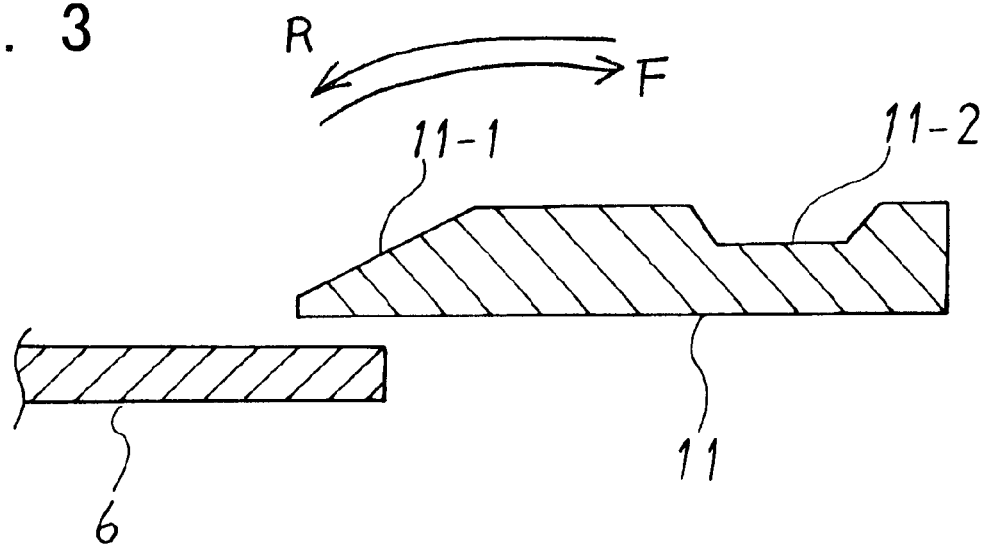
FIG. 3 is a cross-sectional view of the ramp in FIG. 1.
Figure 4:
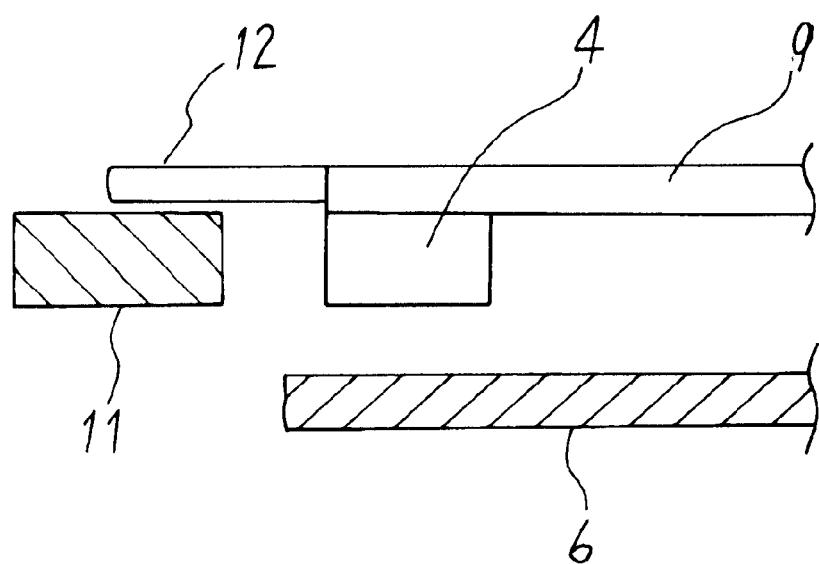
FIG. 4 is a front view of the ramp in FIG. 1.
Figure 5:
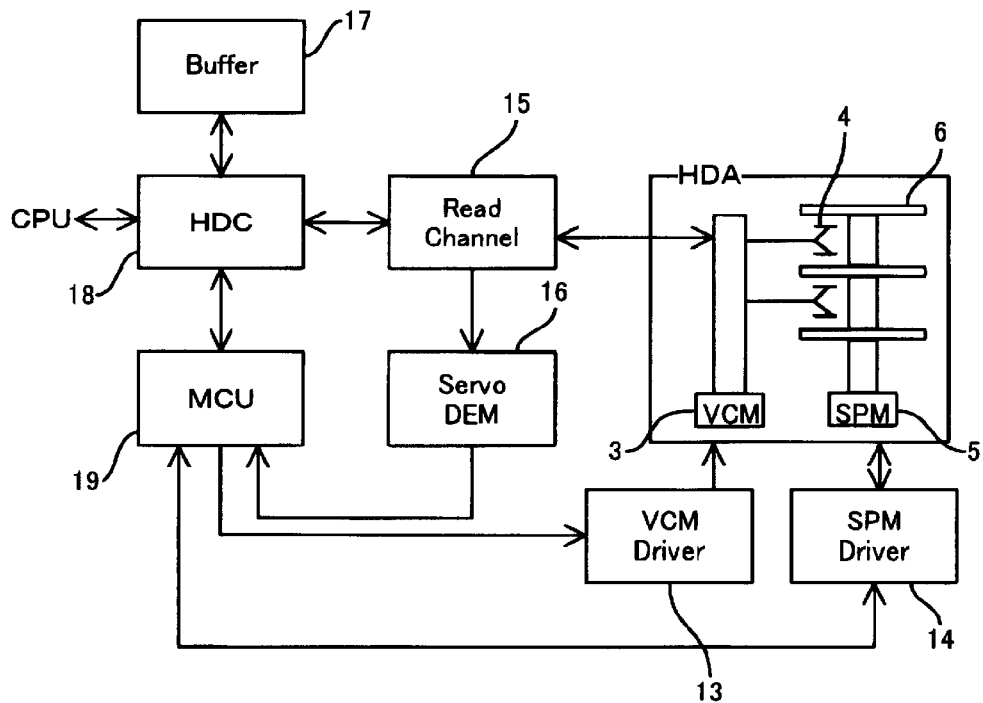
FIG. 5 is a block diagram of the storage device in FIG. 1.

FIG. 1 is a top view of the storage device of an embodiment of the invention, FIG. 2 is a cross-sectional view of that storage device, FIG. 3 and FIG. 4 are drawings of the ramp, and FIG. 5 is a block diagram of the storage device. In this example, a hard disk drive is used as the storage device.

As shown in FIG. 1 and FIG. 2, magnetic disks 6 are such that they form storage layers on a substrate (disk plate). The size of the magnetic disks 6 is 2.5 inches, and there are three disks inside the drive. A spindle motor supports and rotates the magnetic disks 6. A magnetic head 4 is located on the actuator. The actuator comprises a rotary-type VCM (voice coil motor) 3, arm 8 and flexure (suspension) 9. The magnetic head 4 is attached to the tip of the flexure 9.

The magnetic head 4 reads data and also writes data from and on the magnetic disk 6. The actuator 3 positions the magnetic head 4 at a desired track on the magnetic disks 6. The actuator 3 and spindle motor 5 are located on a drive base 2. A cover 1 covers the drive base 2 and separates the internal working of the drive from the outside. A printed circuit board 7 is located under the drive base, and it contains circuits for controlling the drive. A connector 10 is also located under the drive base 2 and connects the control circuits with the outside.

This drive is compact with dimensions of about 90 mm (Horizontal)×63 mm (Vertical)×10 mm (Width). It is used as the internal disk drive of a personal computer.

As shown in FIG. 1, there is a ramp 11 located away from the magnetic disks 6 on the drive base 2. The ramp 11 is made from synthetic resin or plastic, and when the head is unloaded, it supports the head 4. As shown in FIG. 4, there is a lift tab 12 on the tip of the suspension 9 that supports the magnetic head 4. The lift tab 12 comes in contact with the ramp 11. As shown in FIG. 3, the ramp 11 comprises an inclined surface 11-1 and a depression 11-2. This inclined surface 11-1 is so the head 4 can move smoothly from the magnetic disks 6 to the ramp 11. The depression 11-2 is for mechanically securing the lift tab 12 when the head 4 is unloaded.

FIG. 5 is a block diagram of the control circuits on the printed circuit board 7 and in the drive.

A HDC (hard disk controller) 18 receives commands from the host CPU and generates internal magnetic disk drive control signals for controlling the interface with the host CPU such as receiving data, and for controlling the read/write format of the magnetic disk medium. A buffer 17 is used for temporarily storing write data from the host CPU and for temporarily storing the data read from the magnetic disk.

A MCU (micro-controller) 19 comprises a microprocessor (MPU). The MCU (called the MPU below) 19 performs servo controls for positioning the magnetic head 4. The MPU 19 executes the program stored in memory, detects the position signal from the servo demodulation circuit 16, controls the VCM control current of a VCM drive circuit 13, and controls the drive current of a SPM drive circuit 14.

The VCM drive circuit 13 comprises a power AMP for flowing drive current to the VCM (voice coil motor) 3. The SPM drive circuit 14 comprises a power AMP for flowing drive current to the spindle motor (SPM) 5 that rotates the magnetic disk 6.

A read channel 15 is the circuit for reading and writing. The read channel 15 comprises a modulation circuit for writing the write data from the host CPU to the magnetic disk medium 6, a parallel-to-serial conversion circuit, a demodulation circuit for reading data from the magnetic disk medium 6 and a serial-to-parallel conversion circuit. The servo demodulation circuit 16 is a circuit for demodulating the servo pattern written to the magnetic disk medium 6, and comprises a peak hold circuit and an integrating circuit.

It is not shown in the figures, however in the drive HDA there is a head IC that comprises a write AMP that supplies current to the magnetic head 4 for writing, and a pre AMP for amplifying the read voltage from the magnetic head 4.

Here an example of a magnetic disk drive is explained as the storage device, however, it is also possible to use an optical disk drive such as a DVD or MO, a magnetic card device or an optical card device. Here a device capable of reading and writing is shown, however a read-only device (reproduction device) could also be used.

Loading/Unloading Process

Figure 6:
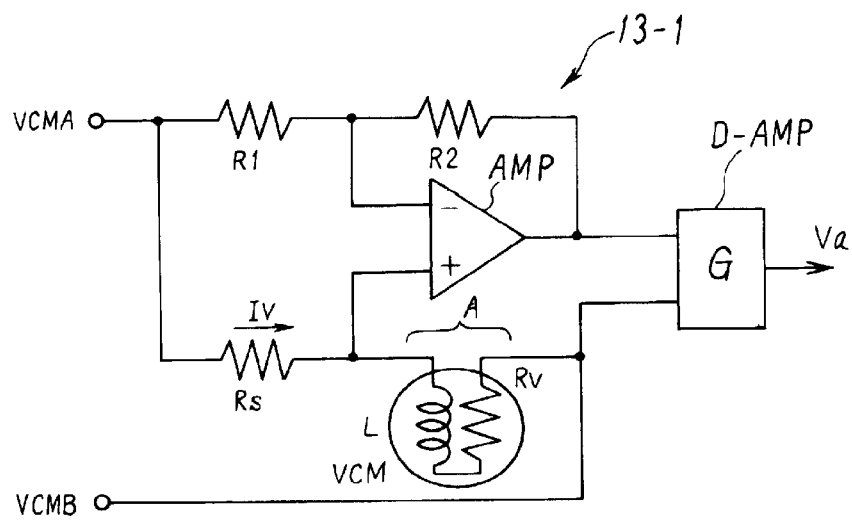
FIG. 6 is a block diagram of the back emf detection circuit in FIG. 5.

FIG. 6 is a circuit diagram of the VCM counter electromotive voltage detection circuit that is located in the VCM drive circuit shown in FIG. 5.

As shown in FIG. 6, the VCM coil 3 has resistance Rv and inductance L. This inductance L is connected to the current sensing resistance Rs. In parallel to this, there is resistance R1 for detecting the counter electromotive voltage that corresponds to the resistance Rs, and resistance R2 for detecting the counter electromotive voltage that corresponds to the resistance Rv. An amp AMP subtracts the middle potential of the resistance R1 and R2 from the potential of resistance Rs. A difference amp D-AMP takes the difference between the potential of the VCM resistance Rv and the output potential of the amp AMP. Here, when the gain of the difference amp D-AMP is taken to be 'G', the voltage at both ends of the VCM is taken to be 'A', and the VCM current is taken to be 'Iv', then the detected:voltage 'Va' is expressed by the following equation:

$$Va = G\ (Iv \times Rs \times R2/R1 - A) \quad (1)$$

Here, when the counter electromotive voltage of the VCM is Vb, then the voltage at both ends A is expressed by the following equation:

$$A = Iv \times Rv + Vb \quad (2)$$

When this is substituted into equation (1), equation (3) below is obtained.

$$Va = G[Iv \times Rs \times R2/R1 - (Iv \times Rv + Vb)] Va = G[(Rs \times R2/R1 - Rv)Iv - Vb] \quad (3)$$

From equation (3), VCM current Iv is the drive instruction current and is already known, so it is possible to detect the counter electromotive voltage from the detected voltage Va. The VCM counter electromotive voltage is obtained from the product of the power constant and velocity, so it is possible to detect the velocity from the VCM counter electromotive voltage that is detected.

In other words, the real velocity vr of the VCM motor can be obtained from equation (4) below.

$$vr = Ke \times Vb = Ke \times (K \times Iv - Va) \quad (4)$$

Here, Ke is the correction coefficient obtained from the power constant, and K is (Rs×R2/R1−Rv) in equation (3). Also, the gain 'G' is taken to be '1'.

Figure 7:
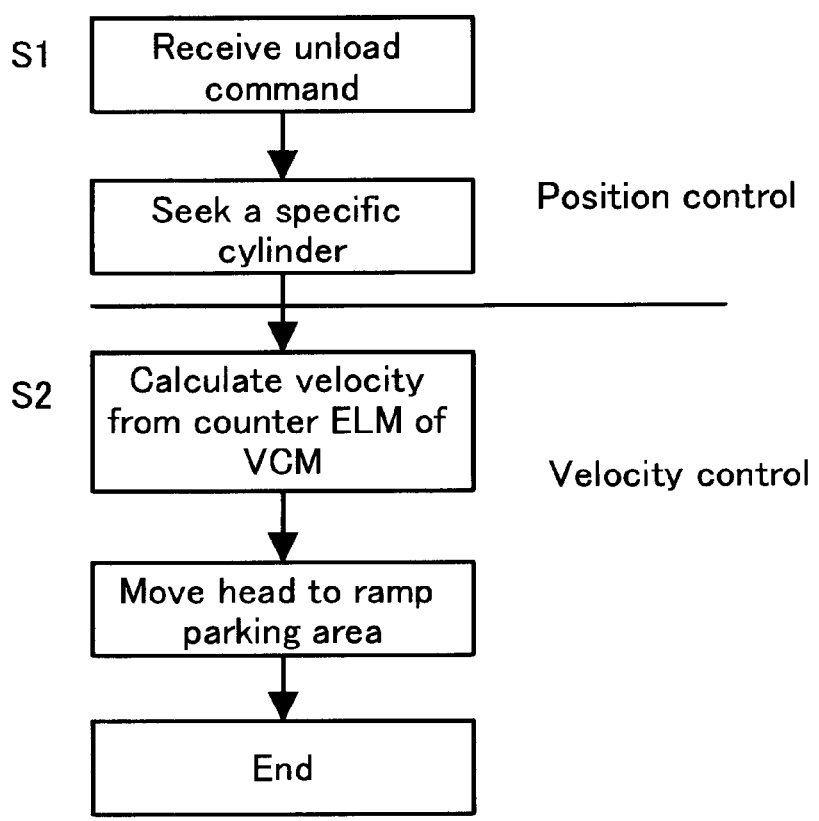
FIG. 7 is a flowchart showing the unloading process of an embodiment of this invention.
Figure 8:
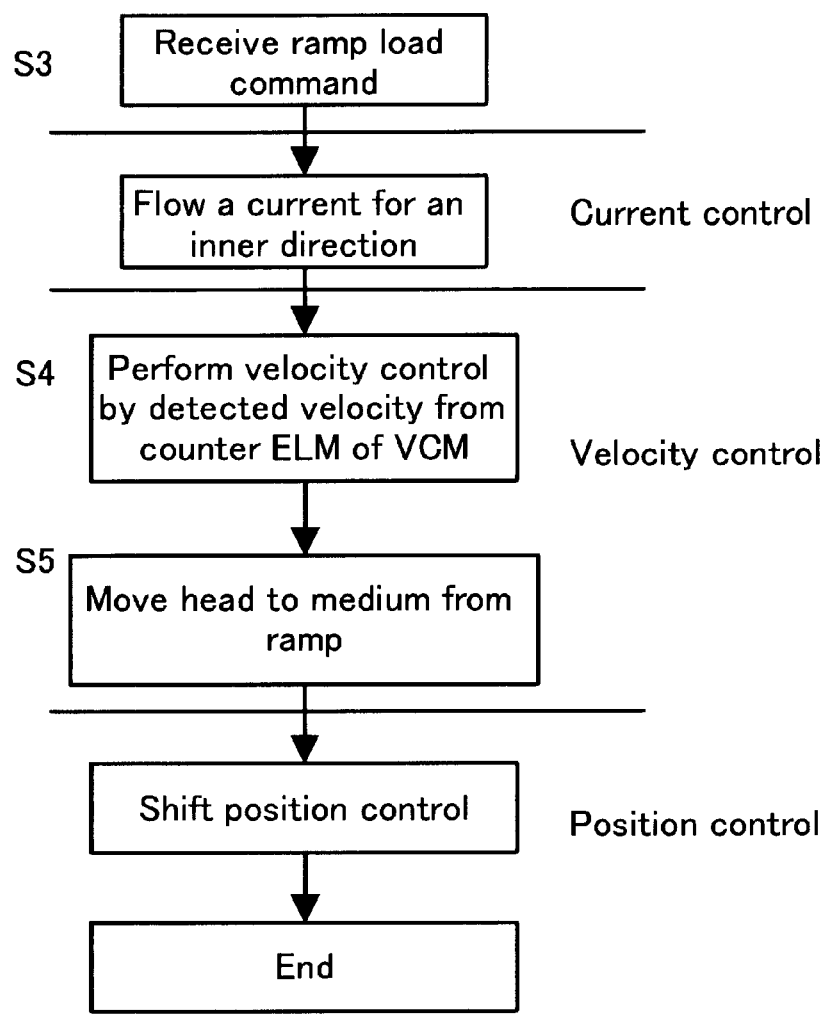
FIG. 8 is a flowchart showing the loading process of an embodiment of this invention.

The process of detecting the velocity from this counter electromotive, voltage of the VCM as well as the loading/unloading process are explained in FIG. 7 and FIG. 8. FIG. 7 is a flowchart of the unloading process.

(S1) When the MPU 19 (see FIG. 5) receives the unload command, the VCM 3 seeks a specified cylinder (in the proximity of the ramp 11 in FIG. 3) of the magnetic disk 6. When doing this, the MPU 19 detects the current position, and current velocity based on the servo information that is read from the magnetic disk 6 by the head 4 and performs position control according to detected position and velocity.

(S2) Next, the MPU 19 drives the VCM 3 to the outer stopper position. When doing this, the MPU 19 detects at a specified sample time, the detected voltage Va of the aforementioned VCM countered electromotive voltage detection circuit 13-1, and calculates the real velocity using equation (4). In addition, it calculates the VCM drive current Iv from the difference between the target velocity and real velocity, and controls the velocity of the VCM 3 by way of the VCM drive circuit 13.

In this way, as shown by the arrow F in FIG. 3, a lift tab 12 is guided to and slid up the inclined surface 11-1 of the ramp 11 toward the depression 11-2 and stacked in the depression 12 (ramp parking area). Therefore, the head 4 is held at a position P0 away from the magnetic disk 6 as shown in FIG. 1.

At this position, the head 4 does not face the magnetic disk 6 so there is now impact between the head 4 and the magnetic disk 6 even when there is shock or vibration. Also, since the magnetic head 4 is supported mechanically, the magnetic head 4 does not vibrate due to shock. This makes it possible to improve the resistance to shock. Moreover, since the head 4 is held mechanically, there is no need for current to flow to the VCM 3. This makes it possible to reduced the power consumption.

Furthermore, in ultra-compact devices, the components are very densely arranges so heat radiation is difficult. At this position, since there is no current flowing to the VCM 3, it is possible to prevent the temperature of the device from rising.

Here, the meaning of velocity control will be explained. During ramp unloading, the magnetic head 4 is separated from the magnetic disk 6 so the magnetic head 4 cannot read servo information from the magnetic disk 6. Therefore, it is not possible to obtain the velocity from the magnetic head 4.

On the other hand, the magnetic head 4 floats from the magnetic disk 6 and since the amount that it rises is small, there is suction force between the magnetic head 4 and the magnetic disk 6. Therefore, in order to separate the magnetic head 4 from the magnetic disk 6, and for it to climb the inclined surface 11-1 of the ramp 11, it is necessary to drive the VCM 3 at a specified velocity or more. Moreover, when the velocity is too fast, the impact when the VCM 3 hits the outer stopper will be too large and the life of the mechanism will become shorter. Therefore, even when the magnetic head 4 cannot read the servo information from the magnetic disk 6 during ramp unloading, the velocity is controlled by using the counter electromotive voltage of the VCM 3.

Next, FIG. 8 will be used to explain the loading process. (S3) When the MPU 19 receives a ramp load command, it uses the VCM 3 to drive the head 4 toward the magnetic disk 6. First, the MPU 19 flows a fixed release current to the VCM 3 to move the lift tab 12 from the depression 11-2 in the ramp 11. By doing this, the lift tab 12 is moved out of the depression 11-2 in the ramp 11.

(S4) Next, the MPU 19 detects the detected voltage Va from the VCM counter electromotive voltage detection circuit 13-1 at a specified sample time, and using equation (4) above, calculates the real velocity. In addition, it calculates the VCM drive current Iv from the difference between the target velocity and the real velocity, and controls the velocity of the VCM 3 by way of the VCM drive circuit 13. In this way, the lift tab 12 slides down the inclined surface 11-1 from the depression 11-2 in the ramp 11, and moves toward the magnetic disk 6 (R direction in FIG. 3).

(S5) After a specified amount of time has elapsed from the time when velocity control starts, the MPU 19 stops velocity control and moves to position control according to servo information from the magnetic disk 6 and ends. In other words, since the distance from the ramp 11 to the return position on the magnetic disk 6 is already known, as well as the target velocity is known, it is possible to detect when the head has reached the return position on the magnetic disk 6 from the ramp 11 from the time.

In this way, the magnetic head 4 returns to above the magnetic disk 6. Therefore, reading/writing of the magnetic disk 6 by the magnetic head 4 becomes possible. Note that the position P1 in FIG. 1 is the position of the actuator when the drive is assembled.

Here, velocity control is performed during ramp loading, so it is possible to prevent the head 4 from hitting the magnetic disk 6. Moreover, it is also possible to use the counter electromotive voltage of the VCM to perform velocity control during ramp loading when the magnetic head 4 cannot read servo information from the magnetic disk 6.

Velocity Control Method

Figure 9:
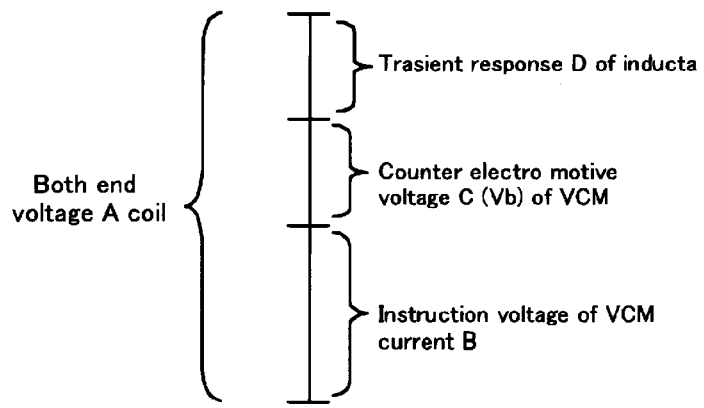
FIG. 9 is a drawing explaining the voltage across both ends of a coil for detecting velocity in this invention.
Figure 10:
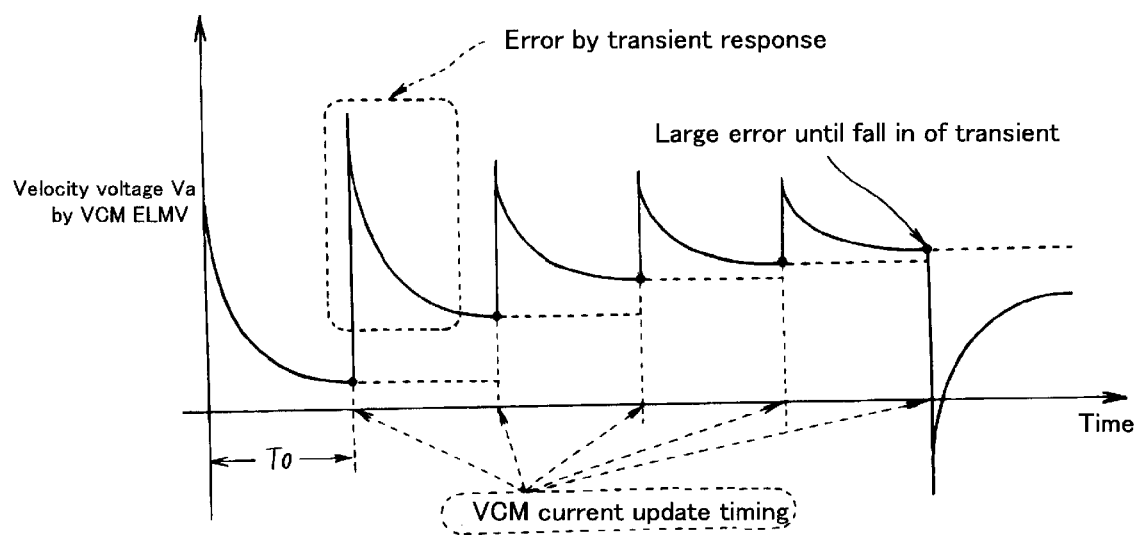
FIG. 10 is a drawing explaining the VCM current update timing of a comparative example.
Figure 11:
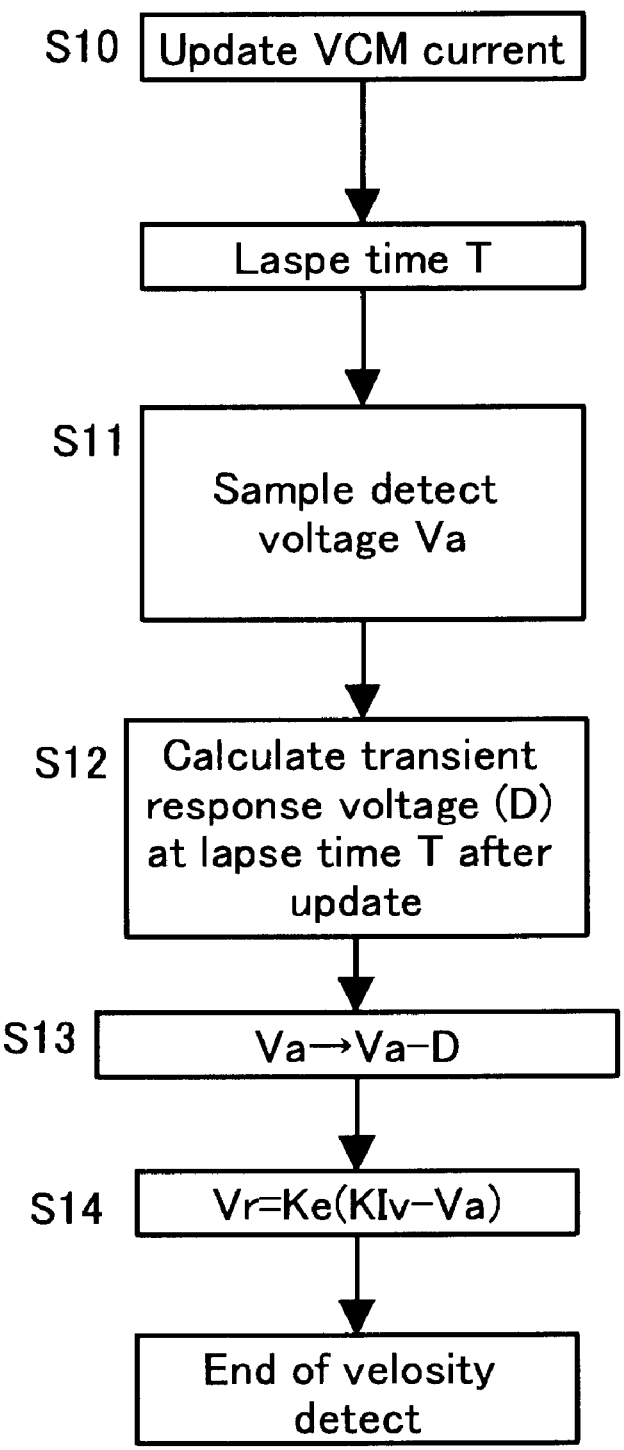
FIG. 11 is a flowchart showing the velocity detection process of an embodiment of this invention.
Figure 12A:
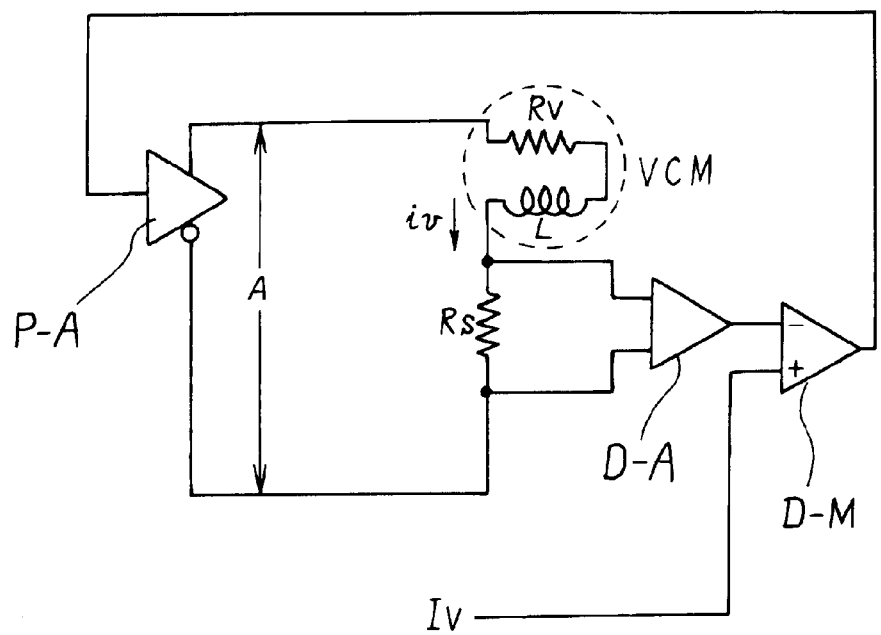
FIGS. 12A and 12B are drawings explaining the transient response model of the process in FIG. 11.
Figure 12B:
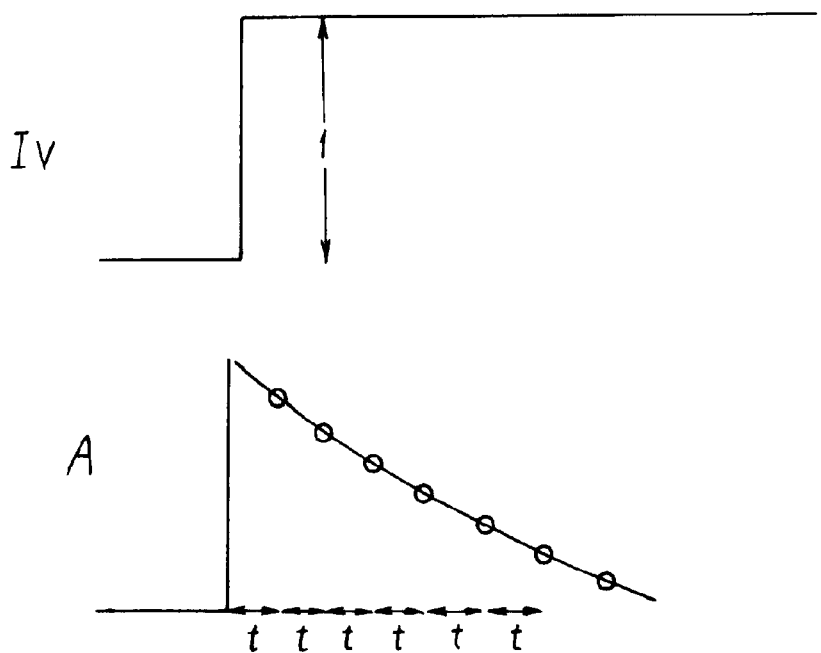
Figure 13:
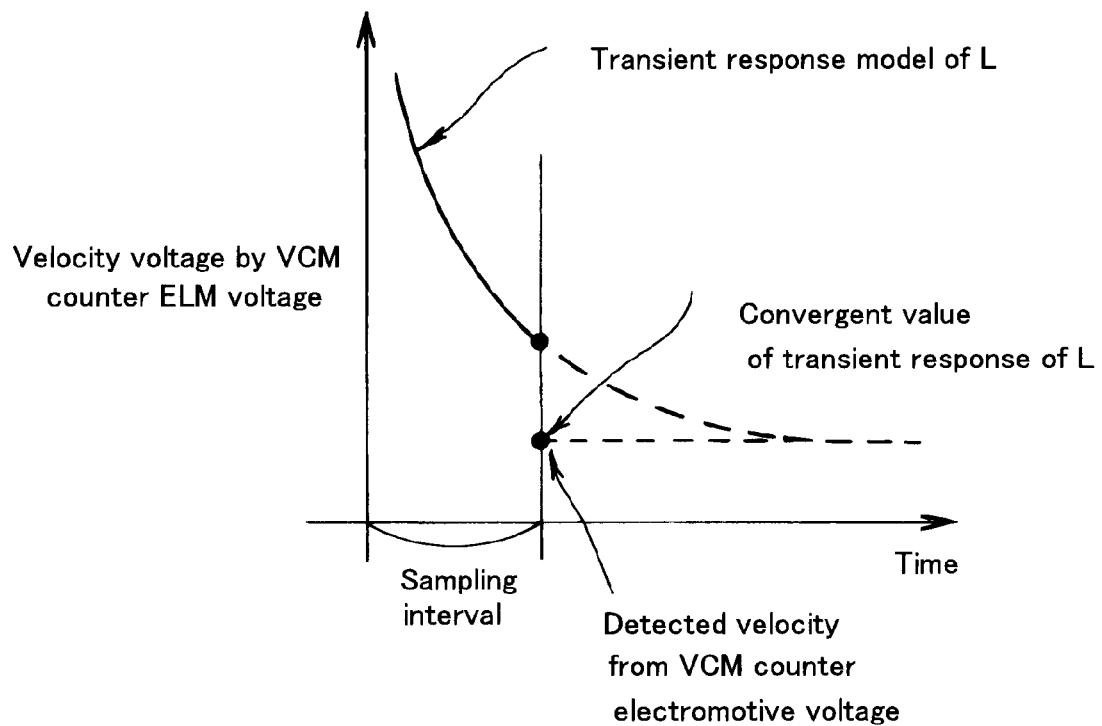
FIG. 13 is a drawing explaining the velocity detection sample interval of an embodiment of this invention.
Figure 14:
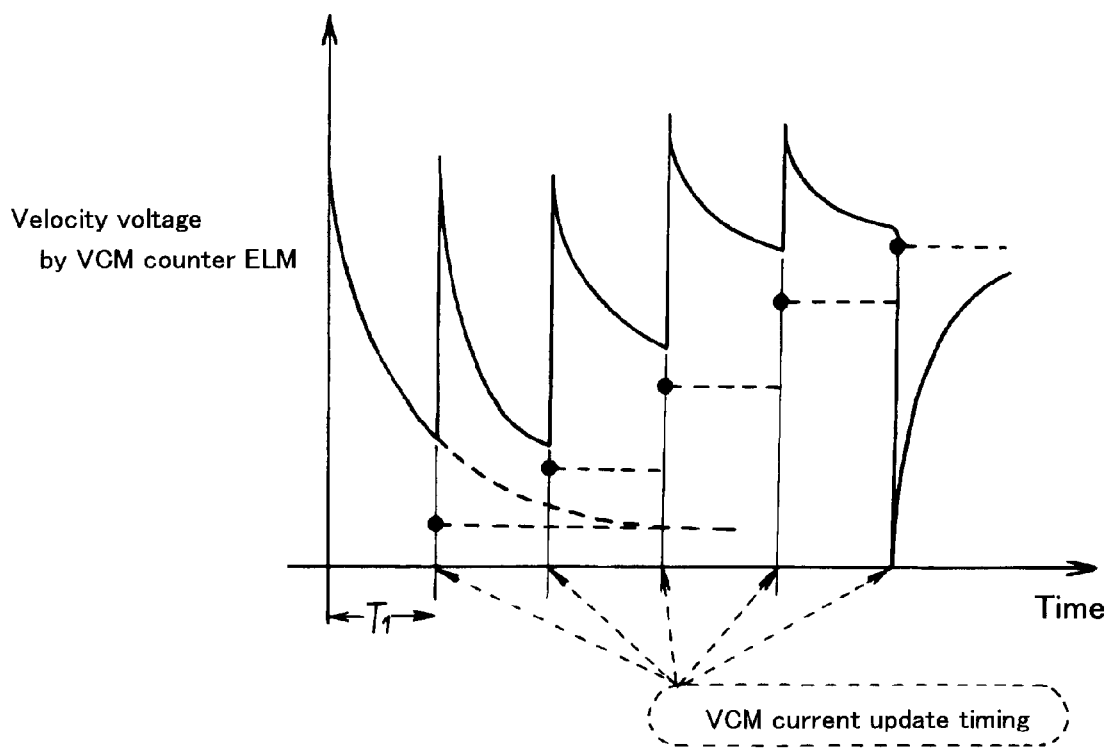
FIG. 14 is a drawing explaining the VCM current update timing of an embodiment of this invention.

Next, a method that makes it possible to execute detection of the velocity in a short sample time according to the counter electromotive voltage of the VCM is explained. FIG. 9 is a drawing explaining the voltage across both ends of the VCM coil, FIG. 10 is a drawing explaining the prior VCM current update timing, FIG. 11 is a flowchart showing the velocity detection process of this invention, FIGS. 12A and 12B are drawings explaining the VCM transient response model of the process in FIG. 11, FIG. 13 is a drawing explaining sample interval in FIG. 11, and FIG. 14 is a drawing explaining the VCM current update timing of this invention.

There is inductance in the VCM, so when step input (update of the current instruction value) is applied, transient response occurs. Also, as shown in FIG. 9, the voltage across both ends of the VCM coil A is expressed as the sum of the voltage B from the VCM instruction current (=Iv×Rv), the VCM counter electromotive voltage C (Vb) and the transient response component D of the VCM inductance. In other words, as shown in FIG. 10, in the voltage A across both ends of the VCM coil, there is a transient response immediately after the current update of the VCM, and after a certain time the transient response settles down. The detected voltage Va of the VCM counter electromotive voltage detection circuit 13-1 shown in FIG. 6 shows a similar transient response.

In other words, errors are large when the velocity is detected (that is, the counter electromotive voltage is detected) during the VCM transient response caused by inductance. To remove this error, it was necessary to wait a certain amount of time until the transient response of the inductance settled down. Therefore, as shown in FIG. 10, in the prior device, after the VCM current is updated, the error is large during the time T0 until the transient response of the inductance has settled down, so it is not possible to detect the counter electromotive voltage of the VCM 3. In addition, the VCM current update timing interval cannot be made shorter due to time T0. Since, high-velocity detection and current update are not possible, velocity errors are great even when velocity control is performed so it is not possible to control the velocity to the target velocity.

In this embodiment, this VCM current update timing interval is shortened, so it is made possible to accurately detect the VCM counter electromotive voltage even while there is transient response of the VCM 3. Therefore, the transient response of the VCM 3 is modeled beforehand, and the transient response voltage of the VCM 3 is calculated, and from this the detected voltage is corrected.

FIG. 12A is a block diagram of the VCM drive circuit. As shown in FIG. 12A, the VCM 3 is expressed a resistance R (Rv) and inductance L. The resistance Rs is the aforementioned sensing resistance. A first difference amp D-A detects the VCM current Id from the voltage across both ends of the resistance Rs. A second difference amp D-M controls the output voltage of the power amp according to the difference between the instruction current Iv and the detected current Id.

In order to obtain a model of the VCM transient response, a unit step input is applied to the drive circuit. As shown in FIG. 12B, the instruction current Iv of the unit step ([1]) is applied to the drive circuit. Also, the voltage A across both ends of the VCM coil 3 is sampled at intervals time t, and the sample value Sn (n=1, 2, . . . ) is stored in memory. This makes it possible to make a model of the transient response in memory.

Next, the velocity detection process using this transient response model as shown in FIG. 11 is explained.

(S10) After the MPU 19 updates the VCM current, it waits only the time T.

(S11) After time T elapses, the MPU 19 samples the detected voltage Va of the VCM counter electromotive voltage detection circuit.

(S12) The MPU 19 calculates the transient response voltage D after time T from the transient response model in memory. In other words, it reads the sample value after time T from the sample value in memory, and multiplies the read sample value by the instruction current and calculates the transient response voltage D after time T.

(S13) The MPU 19 subtracts the transient response voltage D from the detected voltage Va, and calculates the corrected detected voltage Va.

(S14) The MPU 19 substitutes the corrected detected voltage Va into the aforementioned equation (4) and calculates the real velocity vr.

The MPU 19 then calculates the amount of control (VCM current instruction value) from the velocity difference between the target velocity and real velocity vr, and updates the VCM current by using the velocity difference.

In this way, the transient response voltage D for the current instruction value is calculated and subtracted from the detected voltage, as shown in FIG. 13, after VCM current is updated, it is possible to accurately detect the velocity even when detecting the VCM counter electromotive voltage while there is a VCM transient response.

Therefore, as shown in FIG. 14, it is possible to shorten the VCM counter electromotive voltage detection interval and the VCM current update timing interval as T1. This makes it possible to perform high-speed velocity detection and current update, and thus makes it possible to control the velocity to the target velocity with little velocity error, even when velocity control is performed. In this example, the update interval T1 is ⅓ the time TO in FIG. 10, so velocity control can be performed three times faster.

Moreover, in the example above, the VCM transient response included in the output voltage Va of the counter electromotive voltage detection circuit is corrected, however, as shown in FIG. 9, it can also be used to correct the voltage across both ends of the VCM. In other words, in a circuit in which there is no counter electromotive voltage detection circuit, and where the voltage across both ends of the VCM is detected from the VCM drive circuit and the real velocity is calculated, the VCM transient response voltage is subtracted from the voltage across both ends of the VCM to correct the voltage across both ends of the VCM, then by subtracting the voltage B corresponding to the VCM instruction current, it is possible to accurately detect the counter electromotive voltage of the VCM.

Furthermore, this velocity detection method can be executed during times other than loading/unloading and even when there is no loading/unloading mechanism. Also, it can be applied to detecting the velocity of a motor other than the VCM of a hard disk for which the velocity is controlled.

Loading/Unloading Process Including Calibration

Next, the velocity offset coefficient K in equation (4) is regulated by the resistance, that is (Rs×R2/R1−Rv). Ideally, the velocity offset coefficient would be '0', however, the velocity offset coefficient K changes according to the resistance of VCM counter electromotive voltage detection circuit 13-1, and the resistance of the VCM counter electromotive voltage detection circuit and VCM due to temperature change. Therefore, it is necessary to calibrate the velocity offset coefficient K.

Figure 15:
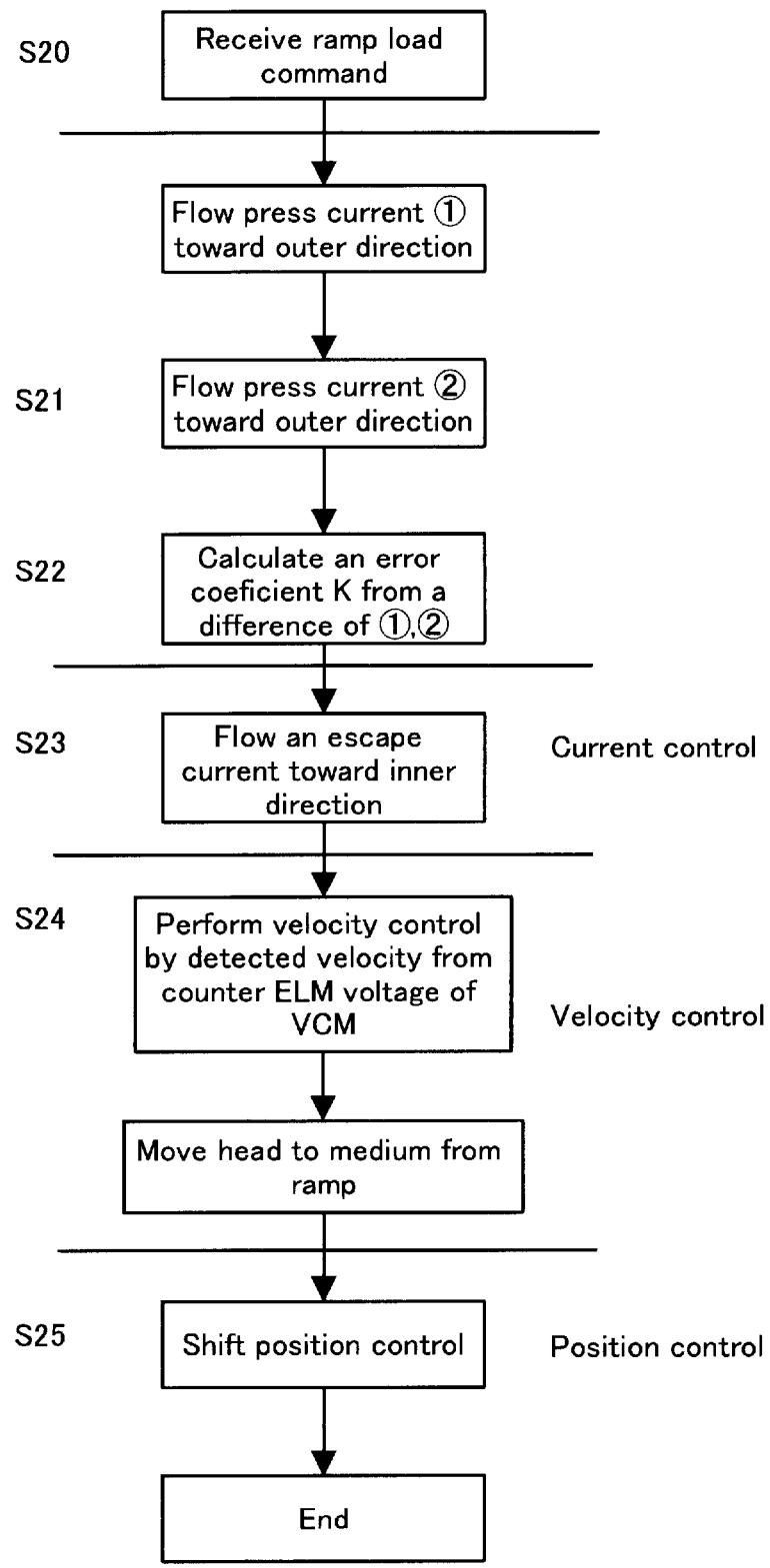
FIG. 15 is a flowchart of the loading process of another embodiment of this invention.
Figure 16:
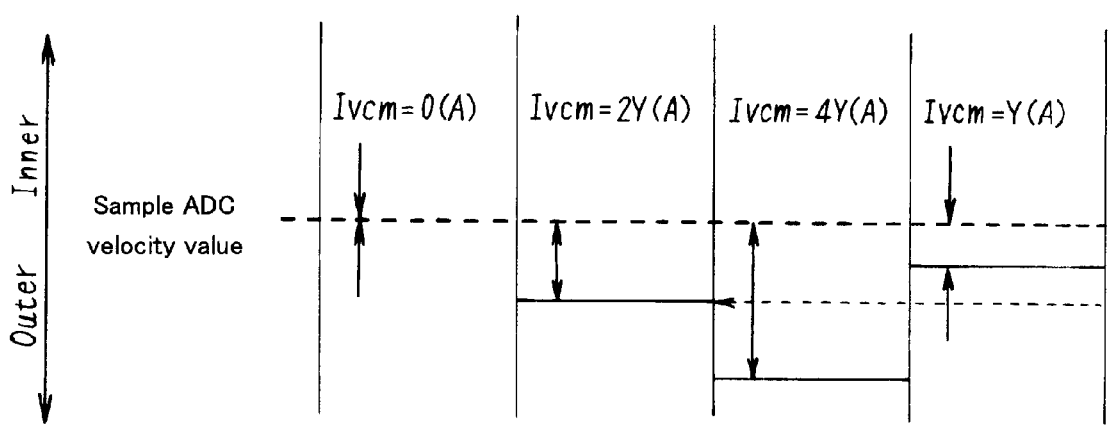
FIG. 16 is a drawing explaining the operation of the loading process of another embodiment of this invention.

FIG. 15 is a flowchart showing the loading process which includes calibration of this invention, and FIG. 16 is a drawing explaining the calibration operation.

(S20) When the MPU 19 receives a ramp load command, it sends a first forcing current I1 to the VCM 3 to move in the outer direction. As described above, at the unload position (parking area), the VCM 3 is positioned at that outer stopper, so even when the forcing current flows, the VCM 3 does not move in the outer direction. Also, the MPU 19 reads the detected voltage V1 from the VCM counter electromotive voltage detection circuit 13-1 at this time.

(S21) Next, the MPU 19 sends a second forcing current I2 to the VCM 3 to move in the outer direction. This second forcing current I2 is different than the first forcing current I1. As described above, at the unload position (parking area), the VCM 3 is positioned at that outer stopper so the VCM 3 does not move in the outer direction even when the forcing current flows. Also, the MPU 19 reads the detected voltage V2 from the VCM counter electromotive voltage detection circuit 13-1 at this time.

(S22) In this way, as shown in FIG. 16, with the VCM 3 in a fixed state, since the velocity offset coefficient K is not zero when drive current Iv flows in the VCM 3 regardless of whether the velocity is zero, the detected voltage will not be zero. The velocity offset coefficient is obtained from the aforementioned detected voltages V1, V2 and currents I1, I2.

From equation (3) above, V1=K×I1−Vb, and V2=K×I2−Vb. Also, the velocity offset coefficient K is obtained from equation (6) below.

$$K=(V2-V1)/(I2-I1) \tag{6}$$

(S23) In this way, after the velocity offset coefficient K is calibrated, the MPU 19 drives the head 4 by the VCM 3 in the direction of the magnetic disk 6. First, in order to be removed from the depression 11-2 in the ramp 11, the MPU 19 flows a fixed release current to the VCM 3 in the inner direction. This makes it possible for the lift tab 12 to be removed from the depression 11-2 in the ramp 11.

(S24) Next, the MPU 19 detects the detected voltage Va from the aforementioned VCM counter electromotive voltage detection circuit 13-1 at a specified sample time, and using the calibrated velocity offset coefficient K in equation (4), calculates the real velocity. In addition, it calculates the VCM drive current Iv from the difference between the target velocity and the real velocity, and controls the velocity of the VCM 3 by way of the VCM drive circuit 13. In this way, the lift tab 12 slides down the inclined surface 11-1 from the depression 11-2 in the ramp 11 and moves toward the magnetic disk 6 (direction R in FIG. 3).

(S25) After a specified amount of time has elapsed after the start of velocity control, the MPU 19 stops velocity control, and shifts to positioning control according to the servo information from the magnetic disk 6 then ends. In other words, since the distance from the ramp 11 to the return position of the magnetic disk 6 is known, as well as the target velocity is known, it is possible to detect when the head 4 has reached the return position of the magnetic disk 6 from the ramp 11 from the time.

In this way, the magnetic head 4 returns to above magnetic disk 6. Therefore, reading/writing of the magnetic disk 6 by the magnetic head 4 is possible.

By flowing current to the VCM 3 with the VCM 3 in a fixed state and obtaining the detected voltage in this way, it is possible to calibrate the velocity offset coefficient K. Moreover, in this embodiment, since it is calibrated when loading starts, the velocity is accurately detected for controlling the velocity during loading. In other words, it is possible to calibrate the coefficient K before loading even when the resistance changes due to temperature and the velocity offset coefficient changes. Furthermore, since calibration is executed in the unloading area with the VCM fixed to the outer stopper, no special fixing operation is necessary. Therefore the calibration process can be performed in a short time.

This calibration process can be executed at times other than at loading, or even when there is no loading/unloading mechanism. For example, it is possible to have a calibration process that is separate from the loading process, and the aforementioned calibration process can be executed with the VCM 3 fixed at the outer stopper or inner stopper.

Similarly, it can also be applied to the velocity detection of motors other than the VCM of a hard disk. Also, the following can also be used as the method for obtaining the aforementioned velocity offset coefficient. First, the current I1 can be '0'. Second, when the counter electromotive voltage Vb when the VCM is fixed is constant (0), then the velocity offset K can be calculated by detecting the voltage one time. Third, it is possible to perform the aforementioned calibration process more than one time and use the average value as the velocity offset k.

Next, the velocity correction coefficient Ke in equation (4) is determined by the power constant B1 of the VCM 3. However, the power constant B1 of the VCM 3 changes due to changes in temperature. Therefore, it is necessary to calibrate the velocity correction coefficient Ke.

Figure 17:
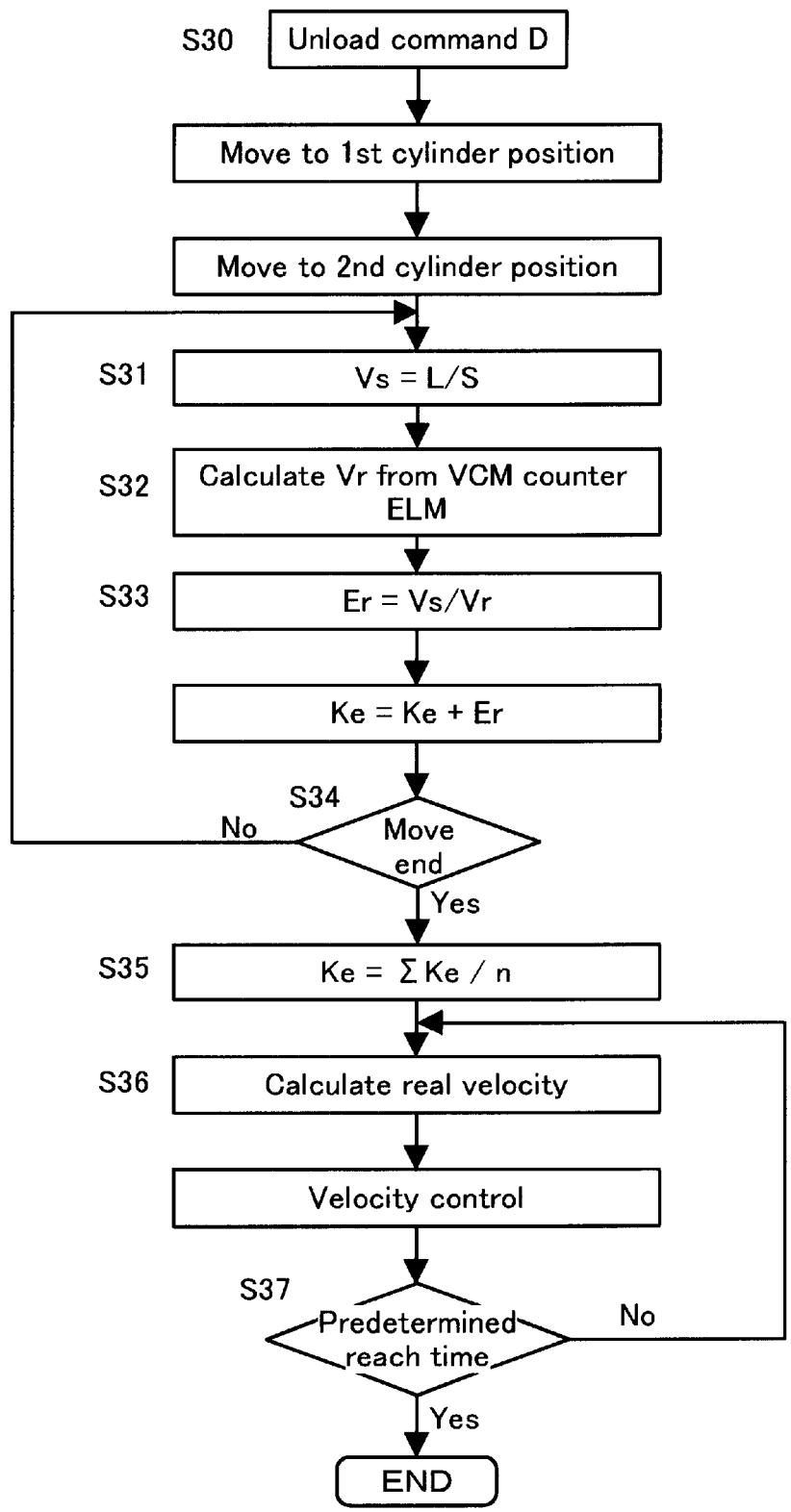
FIG. 17 is a flowchart of the unloading process of another embodiment of this invention.
Figure 18:
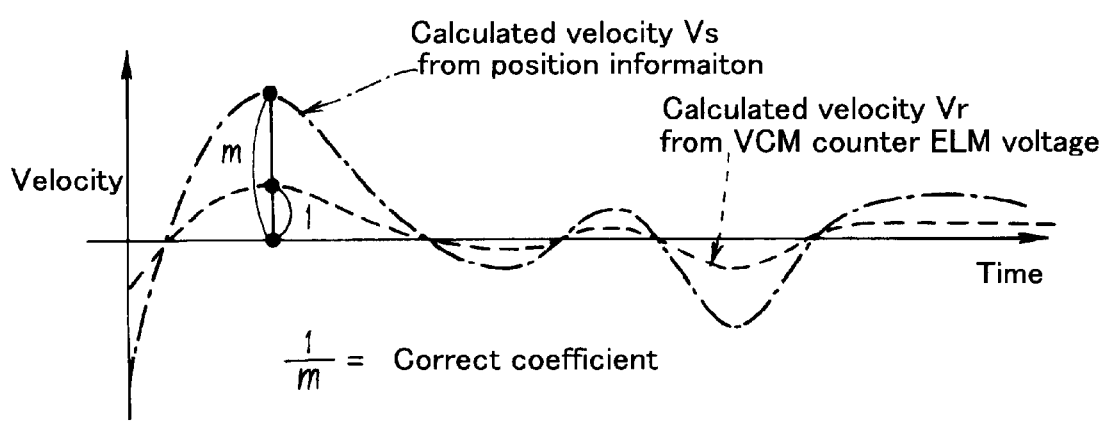
FIG. 18 is a drawing explaining the operation of the unloading process of another embodiment of this invention.

FIG. 17 is a flowchart of the unloading process of this invention that includes calibration, and FIG. 18 is a drawing explaining the calibration operation.

(S30) When the MPU 19 receives an unload command, it first executes calibration. In other words, it causes to move the magnetic head 4 to the first cylinder position of the magnetic disk 6 by the VCM 3. Next, it is started to move the magnetic head 4 to the second cylinder position of the magnetic disk 6 by the VCM 3.

(S31) The MPU 19 detects the VCM 3 position from the servo information read by the magnetic head 4 at each sampling, and then calculates the amount to move L at intervals of one sampling. In other words, the amount to move L, is obtained by subtracting the detected position of the previous sample from the detected position of the current sample. In addition, the MPU 19 calculates the movement velocity vs obtained from the servo information by "L/S". Here, 'S' is the sampling interval.

(S32) The MPU 19 detects the detected voltage Va from the VCM counter electromotive voltage detection circuit 13-1, and using equation (4), it calculates the movement velocity vr obtained from the VCM counter electromotive voltage.

(S33) Next, the MPU 19 calculates the gain error Er from the velocity ratio (vs/vr). As shown in FIG. 18, the velocity vs calculated from the position information does not change according to the temperature because it is from the servo information. It is used as a reference when correcting the velocity correction coefficient Ke. In other words, the velocity correction coefficient Ke is obtained from 'Ke+Er'. This velocity correction coefficient is stored in memory.

(S34) Next, the MPU 19 determines whether the head 4 has reached the second cylinder position. In the case that the head 4 has not reached the position, it returns to step S31.

(S35) When the MPU 19 determines that the head 4 has reached the second cylinder position, it adds the velocity correction coefficients Ke obtained from each sampling, and divides the sum by the number of samples n to get the average value. As shown in FIG. 18, the average value is used since the detected velocities vs, vr change. This average value is stored in memory as the velocity correction coefficient.

(S36) Next, the MPU 19 drives the VCM 3 to the outer stopper position. The MPU 19 detects the detected voltage Va from the VCM counter electromotive voltage detection circuit 13-1 at a specified sample time, and calculates the real velocity using the velocity correction coefficient Ke, that is stored in memory, and equation (4). In addition, it calculates the VCM drive current Iv from the difference between the target velocity and the real velocity, and control the velocity of the VCM 3 by way of the VCM drive circuit 13.

In this way, as shown by the arrow F in FIG. 3, the lift tab 12 is guided by the inclined surface 11-1 of the ramp 11 toward the depression 11-2.

(S37) After a specified amount of time has elapsed after the start of velocity control, the MPU 19 stops velocity control. In other words, since the distance from the second cylinder of the magnetic disk 6 to the depression 11-2 is known, as well as the target velocity is known, it is possible to detect when the head 4 reaches the depression 11-2 in the ramp 11 from the time. In this way, the lift tab 12 is stored in the depression 11-2 (parking area). Therefore, the head 4 is held at position P0 away from the magnetic disk 6 as shown in FIG. 1.

Since the movement velocity, that is obtained from the position information from the magnetic disk 6, and the movement velocity, that is obtained from the counter electromotive voltage of the VCM 3, are measured in this way, it is possible to calibrate the velocity correction coefficient Ke. Moreover, in this embodiment, since the coefficient Ke is calibrated at the start of unloading, it is possible to accurately detect the velocity for controlling the velocity during unloading. In other words, it is possible to calibrate the coefficient Ke before the unloading operation even when the power constant of the VCM or the velocity correction coefficient changes due to temperature. Furthermore, since calibration is performed while on track, there is no need for a special operation. Therefore, the calibration process can be performed in a short period of time.

This calibration process can be executed at times other than at unloading, or even when there is no loading/unloading mechanism. For example, it is possible to have a calibration process that is separate from the unloading process, and the aforementioned calibration process can be executed by moving the VCM 3 fixed to a cylinder. Similarly, it can also be applied to the velocity detection of motors other than the VCM of a hard disk.

Besides the embodiments described above, the invention can also take the following form.

(1) In the embodiments described above, the invention is explained for unloading control of the head of a magnetic disk drive, however, the invention can also be applied to other storage devices, such as unloading control of a head for an optical disk drive, etc.

(2) Similarly, a ramp having a different shape can be used.

The preferred embodiments of the present invention have been explained, however the invention is not limited to these embodiments and can be embodied in various forms within the scope of the present invention.

As explained above, this invention has the following effect:

(1) The velocity is detected from the counter electromotive voltage of the actuator during loading/unloading when the head is unable to read the position information from the storage medium, making it possible to control the velocity even during loading/unloading.

(2) It is possible to execute the loading/unloading operation smoothly and at high velocity.

(3) The transient response voltage of the actuator is calculated and subtracted from the detected voltage, so accurate velocity can be obtained even when the counter electromotive voltage is detected while there is a transient response of the actuator. This makes it possible to shorten the current update interval and to perform high-precision velocity control.

(4) The velocity offset coefficient for converting the counter electromotive voltage to velocity is calibrated. Therefore, it is possible to calibrate a suitable velocity offset coefficient that corresponds to the device and temperature, making it possible to obtain accurate velocity even when detecting the counter electromotive voltage.

(5) The velocity correction coefficient for converting the counter electromotive voltage to velocity is calibrated. Therefore, it is possible to calibrate a suitable velocity correction coefficient that corresponds to the device and temperature, making it possible to obtain accurate velocity even when detecting the counter electromotive voltage.

What is claimed is:

1. A storage device comprising:
   a head for at least reading a storage medium;
   an actuator for positioning said head at a specified location on said storage medium;
   a ramp for supporting said head and located at a position away from said storage medium;
   a counter electromotive voltage detection circuit for detecting the counter electromotive voltage of said actuator;
   a memory for storing specified parameters; and
   control means for unloading said head from said storage medium to a position on said ramp and for loading said head from said ramp at a position on said storage medium,
   wherein said control means calculate a control amount to control said actuator and correct said parameter when said unloading or said loading, based on said detected output of said back counter electromotive voltage detection circuit and said parameters.

2. The storage device of claim 1 wherein:
   said control means update a drive current of said actuator, then substract a transient response voltage of said actuator from a detected voltage of said actuator to calculate the counter electromotive voltage of said actuator and calculate a moving velocity of said actuator from said counter electromotive voltage.

3. The storage device of claim 1 wherein:
   said control means flow drive current to said actuator with said actuator in a fixed state, and measure a velocity offset coefficient of said actuator.

4. The storage device of claim 3 wherein:
   said control means measure said velocity offset coefficient during said loading.

5. The storage device of claim 1 wherein:
   said control means calibrate a correction coefficient for converting said counter electromotive voltage to said movement velocity from a first movement velocity of said actuator calculated from position information read by said head from said storage medium, and from a second movement velocity detected from the counter electromotive voltage of said actuator.

6. A storage device comprising:
   a head for at least reading a storage medium;
   an actuator for positioning said head at a specified location on said storage medium;
   a ramp for supporting said head and located at a position away from said storage medium;
   a counter electromotive voltage detection circuit for detecting the counter electromotive voltage of said actuator;
   a memory for storing a correction amount to correct the output of said counter electromotive voltage detection circuit; and
   control means for unloading said head from said storage medium to a position on said ramp and for loading said head from said ramp at a position on said storage medium,
   wherein said control means calculate a control amount to control said actuator when said unloading or said loading, based on said detected output of said counter electromotive voltage detection circuit and said correction amount.

7. An actuator control method for calculating a control amount of an actuator from a counter electromotive voltage of said actuator and comprising:
   a step of detecting the counter electromotive voltage of said actuator from a counter electromotive voltage detection circuit; and
   a step of calculating the control amount of said actuator from said counter electromotive voltage and a correction amount for the output of said back counter electromotive voltage detection circuit.

8. An actuator control method for calculating a control amount of an actuator from a counter electromotive voltage of said actuator and comprising:
   a step of measuring a parameter of said actuator;
   a step of detecting the counter electromotive voltage of said actuator; and
   a step of calculating the control amount of said actuator from the detected counter electromotive voltage and said parameter of said actuator.

9. The actuator control method of claim 8 wherein said calculating step comprises:
   a step of updating a drive current of said actuator;
   a step of substracting a transient response voltage of said actuator from a detected voltage of said actuator to calculate the counter electromotive voltage of said actuator; and
   a step of calculating a moving velocity of said actuator from said counter electromotive voltage.

10. The actuator control method of claim 8 further comprising a step of flowing drive current to said actuator with said actuator in a fixed state, and a step of measuring a velocity offset coefficient of said parameter of said actuator.

11. The actuator control method of claim 8 further comprising a step of calibrating a correction coefficient for converting said counter electromotive voltage to said moving velocity from a first movement velocity of said actuator calculated from a detected position, and from a second movement velocity detected from the counter electromotive voltage of said actuator.

12. An actuator control method comprising:

a step of detecting a counter electromotive voltage of said actuator for positioning a head at a specified location on a storage medium;

a step of calculating a control amount of said actuator from the detected counter electromotive voltage and a parameter of said actuator; and a step of controlling said actuator with said control amount when moving said head between a ramp for supporting said head and said storage medium.

13. The actuator control method of claim 12 wherein said calculating step comprises:

a step of updating a drive current of said actuator;

a step of substracting a transient response voltage of said actuator from a detected voltage of said actuator to calculate the counter electromotive voltage of said actuator; and a step of calculating a moving velocity of said actuator from said counter electromotive voltage.

14. The actuator control method of claim 13 wherein:

further comprising a step of flowing drive current to said actuator with said actuator in a fixed state, and a step of measuring a velocity offset coefficient of said parameter of said actuator.

15. The actuator control method of claim 13 further comprising a step of calibrating a correction coefficient for converting said counter electromotive voltage to said moving velocity from a first movement velocity of said actuator calculated from position information read by said head from said storage medium, and from a second movement velocity detected from the counter electromotive voltage of said actuator.

16. The actuator control method of claim 12 wherein:

said measuring step is performed during said moving said head.

17. The actuator control method of claim 12 further comprising a step of positioning said head from position information read by said head from said storage medium when said head is located on said storage medium.

* * * * *